United States Patent [19]

Simms

[11] Patent Number: 5,159,047

[45] Date of Patent: Oct. 27, 1992

[54] COATINGS CONTAINING CAPROLACTONE OLIGOMER POLYOLS

[75] Inventor: John A. Simms, Wilmington, Del.

[73] Assignee: E. I. du Pont de Nemours and Company, Wilmington, Del.

[21] Appl. No.: 715,512

[22] Filed: Jun. 14, 1991

[51] Int. Cl.$^5$ .............................................. C08G 18/80
[52] U.S. Cl. ........................................ 528/45; 528/80; 528/307; 528/363; 528/365
[58] Field of Search .................. 528/45, 80, 307, 363, 528/365

[56] References Cited

U.S. PATENT DOCUMENTS

| | | | |
|---|---|---|---|
| 2,977,385 | 3/1961 | Fowler et al. | 528/80 |
| 4,076,766 | 2/1978 | Simms | 428/492 |
| 4,629,779 | 12/1986 | Koleske | 528/365 |
| 4,701,502 | 10/1987 | Kordomenos et al. | 525/449 |
| 4,751,112 | 6/1988 | Smith Jr. et al. | 525/162 |
| 5,003,004 | 3/1991 | Simms | 525/68 |

FOREIGN PATENT DOCUMENTS

| | | |
|---|---|---|
| 106350 | 4/1984 | European Pat. Off. . |
| 117358 | 9/1984 | European Pat. Off. . |
| 61200120 | 9/1986 | Japan . |

OTHER PUBLICATIONS

Commercial Booklet, F-49592 "Tone Polyols", published Nov. 1982, Union Carbide Corp., Danbury, Ct.

Primary Examiner—Maurice J. Welsh
Assistant Examiner—Rachel Johnson
Attorney, Agent, or Firm—Nancy S. Mayer

[57] ABSTRACT

Crosslinkable coatings that contain a polyol component which is a caprolactone oligomer containing a cycloaliphatic moiety having improved properties, especially lower viscosity and improved coating hardness, and are useful for coating metals and plastics.

29 Claims, No Drawings

COATINGS CONTAINING CAPROLACTONE OLIGOMER POLYOLS

FIELD OF INVENTION

The present invention provides improved crosslinkable coatings that contain a polyol component which is a caprolactone oligomer containing a cycloaliphatic moiety.

BACKGROUND OF THE INVENTION

Most coatings are crosslinkable or thermosetting resins that cure by chemical reactions of the various components to form a crosslinked polymeric coating. Often one of the reactive components in the uncured coating is a polyol that reacts with other complimentary coating components to effect crosslinking. Reactive diluents offer one way to lower volatile organic content with star polymer blends and in blends with acrylic, fluoropolymer, or polyester polyols. It is desirable to have low viscosity reactive diluents that have low volatility but do not excessively lower the hardness of the cured coating.

Japanese Patent Application 61-200120 discloses a process for making lactone oligomers of various alcohols and polyols, and among the list of useful polyols are cyclohexanediol and cyclohexanedimethanol. A cyclohexanedimethanol-caprolactone oligomer is disclosed. There is no mention in this patent of the use of any of these compounds. In particular there is no mention of the caprolactone oligomers of cycloaliphatic polyols for use in coatings.

The use of caprolactone oligomer polyols derived from acyclic polyols has been recommended. See for example commercial booklet "TONE Polyols", "Serial No." F-49592, published 11/82 by Union Carbide Corp., Danbury, CT, which describes caprolactone oligomer polyols for use in coatings. These polyols are derived from acyclic polyols (believed to be diethylene glycol and/or trimethylol propane), and the presence of cyclic polyol residues in the oligomers is not mentioned.

It is the object of this invention to provide an improved polyol coating component that exhibits a good balance of properties in both the cured and uncured coatings. The caprolactone oligomer polyols containing cycloaliphatic moieties, disclosed herein as a coating component, in particular offer the advantages of relatively low viscosity coating, even when solvent levels are low, reasonably rapid curing, and good hardness of the cured coating.

SUMMARY OF THE INVENTION

The present invention comprises a crosslinkable coating composition, wherein a polyol component comprises a compound of the formula

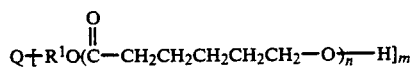

wherein:

$R^1$ is a covalent bond or alkylene containing 1, 2, 3 or 4 carbon atoms;

n is about 1 to about 4;

m is 2, 3 or 4; and

Q is a saturated carbocyclic ring containing 5 or 6 carbon atoms, or $S-R^2-T$ wherein S and T are each independently saturated carbocyclic rings containing 5 or 6 carbon atoms, and $R^2$ is a covalent bond or an alkylene group containing 1, 2, 3 or 4 carbon atoms;

provided that no more than one $R^1$ is bound to any carbocyclic carbon atom, and further provided that when Q is $S-R^2-T$, each $R^1$ is bound to a carbon atom of the carbocyclic rings of S and T.

DETAILS OF THE INVENTION

This invention comprises improved crosslinkable coatings wherein the improvement is a "polyol component" which is an oligomer of caprolactone that includes a cycloaliphatic polyol moiety. Crosslinking coatings are well known to those skilled in the art, and are coatings, that during or after application, cure (crosslink), to form a crosslinked polymeric network which is the final coating. The coatings may cure with or without applied external heat. While some coatings contain only one type of functional group that either acts to crosslink the coating by itself or with components in the air (for example oxygen or moisture), it is common for crosslinkable coatings to contain two or more monomeric, oligomeric and/or polymeric compounds that contain complimentary reactive groups that will react with one another. If the coating is to crosslink, at least one of the functional groups should be present in a tri- (or higher) functional compound, and all other reactive groups should be present in di- (or higher) functional compounds.

In many types of coatings including those of the present invention, one of these complimentary reactive groups may be hydroxyl. The hydroxyl (alcohol) function is quite versatile, and may react with a variety of complimentary reactive groups also suitable for use in the present invention such as epoxy, carboxylic anhydride, isocyanate, ketoxime blocked isocyanate, carboxylic acid, urethane, and formaldehyde modified melamine. Preferred complimentary reactive groups are isocyanate and formaldehyde modified melamine resin, and isocyanate is especially preferred. These preferred complimentary groups are often included with (low molecular weight) polymers, such as styrenic or acrylic polymers.

Examples of coating formulations useful with the polyol component of this invention include those described U.S. Pat. Nos. 4,076,766, 5,003,004, and 4,816,500; in B. N. McBane, "Automotive Coatings", Federation of Societies for Coating Technology, Philadelphia, 1987, p. 24 to 29; R. F. Storey and S. F. Thames, "Proceeding of the Eighteenth Water-Borne, Higher Solids, and Powder Coatings Symposium", Feb. 6-8, 1991, obtainable from the Dept. of Polymer Science, University of Southern Mississippi; and H. F. Payne, "Organic Coating Technology", Vol. I and II, John Wiley & Sons, Inc., New York, 1954 and 1961; all of which are hereby incorporated by reference.

The polyol component of this invention comprises a caprolactone oligomer which has hydroxyl groups, and may be made by initiating caprolactone polymerization with a cyclic polyol. It is known in the art that alcohols (along with certain catalysts), including cyclic alcohols (see for example Japanese Patent Application 61-200120, supra), may be used to initiate the polymerization of caprolactone according to the overall equation:

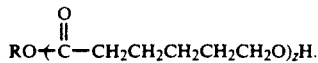

Generally the average degree of polymerization, z, will be the original molar ratio of caprolactone to ROH (or total hydroxyl groups present if ROH were a polyol), assuming the reaction was carried to completion. It is realized by those skilled in the art the product caprolactone oligomer or polymer will have a distribution of degrees of polymerization, z, and that z represents an arithmetic average of that distribution. A general reference for the polymerization of caprolactone is D. B. Johns et al., in K. J. Ivin and T. Saegusa, Ed., Elsevier Applied Science Publishers, Barking, Essex, England, 1984, p. 461–521, which is hereby incorporated by reference.

The specific polyol component of this invention has the formula

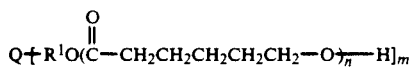

wherein Q, $R^1$, n and m are as defined above. Thus n, which is the average degree of polymerization of each caprolactone chain corresponds to z above. It is preferred that n is from about 1 to about 2. The symbol m represents the functionality (number of hydroxyl groups) of the polyol component, and is preferably 2. $R^1$ is a covalent bond or alkylene group that connects the caprolactone chain to the group Q, Q being a carbocyclic ring or the grouping S-$R^2$-T, which also has carbocyclic rings. It is preferred that $R^1$ is a covalent bond or methylene (—$CH_2$—).

When Q is a carbocyclic ring, preferably it is cyclohexylene, more preferably 1,4-cyclohexylene. When Q is S-$R^2$-T it is preferred if $R^2$ is 2,2-propylene or methylene. It is also preferred if both S and T are each cyclohexylene, and more preferred if both S and T are 1,4-cyclohexylene. As stated above, any $R^1$ must be bound to a carbocyclic ring carbon atom (Q, S or T) and no more than one $R^1$ may be bound to any carbocyclic ring carbon atom.

Thus one skilled in the art will understand that to obtain the polyol component wherein Q is 1,4-cyclohexylene, $R^1$ is a covalent bond, n is two and m is two, one would react one mole of 1,4-cyclohexanediol with 4 moles of caprolactone. Similarly, to obtain the polyol component where Q is 1,4-cyclohexylene, $R^1$ is methylene, n is one and m is two, one would react one mole of 1,4-cyclohexanedimethanol with two moles of caprolactone; to obtain the polyol component where Q is S-$R^2$-T and S and T are 1,4-cyclohexylene, $R^2$ is 2,2-propylene, $R^1$ is a covalent bond, n is 2.5 and m is 2, one would react one mole of 2,2-bis(4-hydroxycyclohexyl)-propane with 5 moles of caprolactone. Other combinations will be evident to the art skilled, and preparations of polyol components are illustrated in Experiments 1 to 4 hereinafter.

The polyol component of the present invention may be used conventionally in coatings in which polyols are normally used. Thus the polyol component may be used as the sole polyol present or may be used in combination with other polyols. Compounds containing complimentary reactive groups will also be present when the coating is to be cured. Other conventional coating components, such as solvents, catalysts, retarders, pigments, leveling agents, gloss enhancing agents, etc., may also be present.

The polyol component of the present invention offers improvements over other polyols. One recent goal of those skilled in the coating art has been to reduce solvent content while maintaining coating quality. The polyol component herein has a relatively low viscosity, and many are liquids, distinct advantages towards lowering solvent content. It is preferred if the polyol component herein is a liquid at the lower of ambient or application temperature. Even if it is not a liquid, a mixture of the polyol components may be used to depress the melting point of the solid individual polyol(s), preferably below room or application temperature, whichever is lower. When compared to other polyols, such as caprolactone oligomers made from acyclic polyols (for example the "Tone" ® polymer described above), the polyol component of the present invention often yields harder cured coatings, an advantage in some applications. In addition, the polyol component of the present invention has relatively low vapor pressure, resulting in lowered atmospheric emissions during application and curing.

The coatings of the present invention are useful in many applications, for example, coating metals (automobiles), for industrial finishes, and for coating hard plastics.

This invention further comprises the cured films which are made from the coating compositions that contain the polyol component of the invention. Cured coating compositions are compositions in which crosslinking has occurred by reaction of complimentary functional groups with each other.

In the following Experiments and Examples, Knoop Hardness is measured according to the method described in G. G. Sward,, "Paint Testing Manual", 13th Ed., The American Society for Testing Materials, Philadelphia, 1972, p. 289 to 290, and bubble viscometers (and the methods associated with them) are described in the same reference, p. 197 to 199.

In the following Experiments and Examples, the following abbreviations are used:

CHDM - cyclohexanedimethanol
CL - ε-caprolactone
KHN - Knoop Hardness
$\overline{M}n$ - number average molecular weight
OH#- hydroxyl number
Tg - glass transition temperature

EXPERIMENT 1

1,4-Cyclohexanedimethanol with 2 Moles of Caprolactone

A 3 L round bottom flask was fitted with a reflux condenser. The stirrer was a stainless steel anchor driven by an air motor with gear reduction. A thermocouple was used to measure temperature of the reactants. The following were charged to the reaction flask:

| Wt. | Component |
|---|---|
| 432.6 g. | 1,4-cyclohexanedimethanol, (Eastman Chemical Products, Inc., Kingsport, Tennessee CHDM-D Glycol) |
| 684.9 g. | ε-caprolactone Tone ® Monomer EC HP, from Union Carbide Corp., |

| Wt. | Component |
|---|---|
| 1.5 g. | Danbury, Connecticut 10% solution of dibutyl tin dilaurate in Xylene |

The above components were heated to 150° C. and held at 150° to 160° C. for 4 hours. Gas chromatography showed that all the caprolactone had been consumed. The product had a viscosity of 7.5 Stokes at 23° C.

EXPERIMENT 2

1,4-Cyclohexanedimethanol with other

Ratios of Caprolactone

Using a procedure similar to that for Experiment 1, various ratios of 1,4-cyclohexanedimethanol were reacted with ε-caprolactone. Table 1 gives the ratio of moles to viscosity and amount of unreacted cyclohexanedimethanol.

TABLE 1

| Reactant Ratio* | Stokes Viscosity | Residual 1.4-CHDM** |
|---|---|---|
| 1/1 | 10.7 | 25 |
| 1.5/1 | 9.3 | 14 |
| 2/1 | 8.2 | 7 |
| 2.5/1 | 6.9 | — |
| 3.0/1 | 6.9 | — |

*Ratio of ε-caprolactone to 1,4-cyclohexanedimethanol
**Wt % cyclohexanedimethanol in the product

EXPERIMENT 3

Hydrogenated Bisphenol-A (HPBA) with Caprolactone

Using a procedure similar to that for Experiment 1, various ratios of HBPA were reacted with ε-caprolactone. Table 2 gives the ratio of moles to viscosity.

TABLE 2

| Reactant Ratio* | Centipoise Viscosity** |
|---|---|
| 2.0/1 | 30,200 |
| 2.5/1 | 14,240 |
| 3.0/1 | 7,920 |
| 4.0/1 | 4,920 |

*Ratio of ε-caprolactone to HBPA
**Brookfield Viscometer, #6 spindle

EXPERIMENT 4

Preparation of a Adduct of 1,4 Cyclohexanediol

Using a procedure similar to that for Experiment 1, 1 mole of 1,4-cyclohexane diol (Quinitol®, from Eastman Chemical Products, Inc., Kingsport, Tennessee) was reacted with 2 moles of caprolactone in a reaction vessel to yield the desired titled adduct.

EXPERIMENT 5

Preparation of an Adduct of 1.6-Hexanediol (a noncarbocyclic diol)

One mole of 1,6-hexanediol was reacted with 2 moles of caprolactone by a procedure similar to that for Experiment 1 to yield the titled product.

The product had a viscosity of 2.3 stokes.

EXPERIMENT 6

Description of Methacrylate Star Polymer

Used for Blending

This star polymer was designed to have good compatibility with the oligomer of Example 1 while also giving cured films with high refractive index for superior gloss. It has the following composition:

| Component | Wt. % in Star |
|---|---|
| End Group* | 1.66 |
| Ethyleneglycol dimethacrylate (EDGMA) | 5.02 |
| Methyl methacrylate (MMA) | 44.34 |
| Benzyl methacrylate (Benzyl MA) | 44.34 |
| 2-Hydroxyethyl methacrylate (HEMA) | 4.64 |

*Contains a hydroxyl group from the initiator that was used.

The star polymer was prepared by the methods described in U.S. Pat. No. 5,003,004 and in J. A. Simms, Rubber Chemistry and Technology, Vol. 64, pp. 139–151 (1991), each of which is herein incorporated by reference.

The design was for 7500 $\overline{M}n$ arms and a 2/1 core to arm mole ratio. Each arm would have an average of 3.83 hydroxyls. Calculated OH# was 27.1 for the star solids. The xylene polymer solution containing this star had a nonvolatile content of 53.7% and a viscosity of 5500 centipoise.

DESCRIPTION OF OTHER POLYMERS USED FOR BLENDING

Lumiflon ® 916, a hydroxyl containing copolymer of trifluorochloroethylene, alkyl vinyl ether and 4-hydroxybutyl vinyl ether of about 6000 number average molecular weight and 90 hydroxyl number was purchased from ICI America, Wilmington, Delaware, as a 65% solution in xylene.

Styrene Acrylic copolymer "A" is a 45° C. Tg linear polymer of about 2500 $\overline{M}n$. It has the wt. % composition styrene/n-butyl methacrylate/n-butyl acrylate/hydroxypropyl acrylate (15/30/17/38), and was prepared at E. I. du Pont de Nemours and Company, Wilmington, Delaware.

Styrene Acrylic copolymer "B" is a 85° C. Tg linear polymer of about 5000 $\overline{M}n$. It has the wt. % composition styrene/i-butyl methacrylate/methyl methacrylate/hydroxyethyl methacrylate 15/45/20/20, and was prepared at E. I. du Pont de Nemours and Company, Wilmington, Delaware.

Crosslinking Agents

Desmodur ® N-3390, a 90% nonvolatile content isocyanate functional isocyanurate was purchased from the Mobay Company, Pittsburgh, Pennsylvania. Its isocyanate content was 5.13 milliequivalents of NCO per gram of solids.

CYMEL ® 1133, an butylated/methylated melamine/formaldehyde resin was purchased from American Cyanamide, Wayne, New Jersey.

EXAMPLE 1

Isocyanate Crosslinked Coatings using Oligomer of Experiment 1 with Styrene/Acrylic Copolymer "B"

The oligomer of Experiment 1 was reacted with copolymer B of Experiment 6 in the presence of the crosslinking agent isocyanate. Table 3 shows the non-volatile content of the coating blends. The isocyanate crosslinked was used at a concentration to give 1.05 NCO groups to 1 OH group.

For sample #2 of Table 3, Copolymer B (22.89 g) as a 59.8% solution in xylene was mixed with 6.0 g of the oligomer of Experiment 1, 1.2 g acetyl acetone (a volatile retarder for the catalyst), 0.06 g of a 10% solution of dibutyl tin dilaurate in propylene glycol monomethyl ether acetate, and 12.46 g of propylene glycol monomethyl ether acetate. Just before use the above blend was mixed with 11.93 g of Desmodur N 3390. This solution contained 55% nonvolatile content. It should be used within about 4 hours. In this instance a coating knife with a 7 mil gap was used to apply a film which when dry was 2.0 mils thick. The remaining samples were prepared in an analogous manner.

TABLE 3

| Sample # | % Copolymer "B" | % Des 3390 | % CHDM Adduct[a] | PHR DBTDL[b] | Viscosity, Stokes[c] | Hardness[d] |
| --- | --- | --- | --- | --- | --- | --- |
| 1 | 76.06 | 23.94 | 0.00 | 0.02 | 1.40 | 12.00 |
| 2 | 44.19 | 35.81 | 20 | 0.02 | 0.411 | 9.72 |
| 3 | 28.26 | 41.75 | 30 | 0.02 | 0.182 | 5.47 |
| 4 | 12.32 | 47.68 | 40 | 0.02 | 0.103 | 1.56 |

[a]Of Experiment 1
[b]Parts per 100 parts of coating polymers of dibutyl tin dilaurate catalyst for isocyanate/polyol reaction
[c]Polymers were thinned with monomethyl ether of propyleneglycol acetate and xylene to 55% nonvolatile content by weight
[d]Cast with a 7 mil coating knife, baked 30 minutes at 121° C. and held 2 weeks at 23° C. Measured as Knoop hardness number.

This showed the ability of the oligomer to reduce the viscosity while maintaining the same nonvolatile content. This allowed the solution to be sprayed at 55% nonvolatile when as little as 20% oligomer was added. Hardness was still in a useful range to 40% oligomer content.

EXAMPLE 2

Isocyanate Crosslinked Coatings using Oligomer of Experiment 1 with Styrene/Acrylic Copolymer "A"

Coating blends were prepared from the oligomer of Experiment 1 and copolymer B of Experiment 6 using the procedure described in Example 1. Table 4 shows the non-volatile content of the coating blends. The isocyanate crosslinked was used at a concentration to give 1.05 NCO groups to 1 OH group.

TABLE 4

| Sample # | % Copolymer "A" | % Des 3390 | % CHDM Adduct[a] | PHR DBTDL[b] | Viscosity, Stokes[c] | Hardness[d] |
| --- | --- | --- | --- | --- | --- | --- |
| 1 | 62.59 | 37.41 | 0.00 | 0.02 | 0.41 | 10.50 |
| 2 | 36.37 | 43.64 | 20 | 0.02 | 0.182 | 6.34 |
| 3 | 23.25 | 46.75 | 30 | 0.02 | 0.163 | 3.65 |
| 4 | 10.14 | 49.86 | 40 | 0.02 | 0.103 | 1.62 |

[a]Of Experiment 1
[b]Parts per 100 parts of coating polymers of dibutyl tin dilaurate catalyst for isocyanate/polyol reaction
[c]Polymers were thinned with monomethyl ether of propyleneglycol acetate and xylene to 55% nonvolatile by weight
[d]Cast with a 7 mil coating knife, baked 30 minutes at 121° C. and held 2 weeks at 23° C. The hardness was measured as Knoop hardness number Although the viscosity of the styrene/acrylic polyol was lower in this instance, there was still a major reduction in viscosity with the addition of the caprolactone/1,4-CHDM adduct. The hardness remained in a useful range.

EXAMPLE 3

Isocyanate Crosslinked Coatings using Oligomer of Experiment 3 with Styrene/Acrylic Copolymer "A"

Coating blends were prepared from the oligomer of Experiment 3 and copolymer A of Experiment 6 using the procedure described in Example 1. In this experiment the 2/1 adduct of caprolactone and hydrogentate bisphenol-A was used. For clarity the compositions are shown on the basis of nonvolatile content. The isocyanate crosslinker was used at a concentration to give 1.05 NCO groups to 1 OH group.

TABLE 5

| Sample # | % Copolymer "A" | % Des 3390 | % HBPA Adduct[a] | PHR DBTDL[b] | Viscosity, Stokes[c] | Hardness[d] |
| --- | --- | --- | --- | --- | --- | --- |
| 1 | 62.59 | 37.41 | 0.00 | 0.02 | 0.41 | 10.50 |
| 2 | 39.13 | 40.87 | 20 | 0.02 | 0.321 | 10.3 |
| 3 | 27.4 | 42.6 | 30 | 0.02 | 0.201 | 10.9 |
| 4 | 15.67 | 44.33 | 40 | 0.02 | 0.182 | 9.88 |

[a]Of Experiment 3
[b]Parts per 100 parts of coating polymers of dibutyl tin dilaurate catalyst for isocyanate/polyol reaction
[c]Polymers were thinned with monomethyl ether of propyleneglycol acetate and xylene to 55% nonvolatile by weight
[d]Cast with a 7 mil coating knife, baked 30 minutes at 121° C. and held 2 weeks at 23° C. The hardness was measured as Knoop hardness number This experiment showed that this adduct caused essentially no reduction in hardness while producing a substantial reduction in viscosity.

EXAMPLE 4

Isocyanate Crosslinked Coatings using the Oligomers of Experiment 3 with Styrene/Acrylic Copolymer "A"

A coating was prepared from the oligomers of Experiment 3 with copolymer A of Experiment 6 using the procedure of Example 1. In this experiment oligomers with different ratios of caprolactone to hydrogenated bisphenol-A were compared. The compositions were compared at 30% oligomer content. For clarity the compositions are shown on the basis of nonvolatile content. The isocyanate crosslinked was used at a concentration to give 1.05 NCO groups to 1 OH group.

TABLE 6

| Sample # | % Copolymer "A" | % Des 3390 | CL to HBPA[a] | PHR DBTDL[b] | Viscosity, Stokes[c] | Hardness[d] |
|---|---|---|---|---|---|---|
| 1 | 27.4 | 42.6 | 2 to 1 | 0.02 | 0.201 | 10.9 |
| 2 | 30.63 | 39.37 | 3 to 1 | 0.02 | 0.271 | 8.41 |
| 3 | 32.78 | 37.22 | 4 to 1 | 0.02 | 0.271 | 4.87 |

The following experiment shows that an oligomer made with 1,6-hexanediol, a noncyclic diol gives very soft films

| 4 | 21.64 | 48.36 | 2 to 1 | 0.02 | 0.144 | <0.5 |

[a]Adducts described in Experiment 3
[b]Parts per 100 parts of coating polymers of dibutyl tin dilaurate catalyst for isocyanate/polyol reaction
[c]Polymers were thinned with monomethyl ether of propyleneglycol acetate and xylene
[d]Baked 30 minutes at 121° C. and held 2 weeks at 23° C.

EXAMPLE 5

Coating Blend Studies With Methacrylate Star Polymer

The 1,4-cyclohexane dimethanol adduct of Experiment 1 was used to prepare coating blends as described in Example 1. Excellent film clarity and gloss were obtained with the 27 OH# star with equal parts and benzyl methacrylate in the arms described above. Different amounts of star were used to change the hardness of the blend coating as shown in the following Table 7.

TABLE 7

| Sample # | % Star Pol. | % Des 3390 | % CHDM Adduct[a] | PHR DBTDL[b] | Viscosity, Stokes[c] | Hardness[d] |
|---|---|---|---|---|---|---|
| 1 | 35 | 36.47 | 28.53 | 0.02 | 0.85 | 2.94 |
| 2 | 30 | 38.90 | 31.10 | 0.02 | 0.65 | 2.23 |
| 3 | 25 | 41.34 | 33.66 | 0.02 | 0.21 | 1.48 |

[a]Of Experiment 1
[b]Parts per 100 parts of coating polymers of dibutyl tin dilaurate catalyst for isocyanate/polyol reaction
[c]Polymers were thinned to 60% by weight with methyl n-amyl ketone and xylene
[d]Films were cast with a 7 mil knife, and allowed to cure for 1 month at 25° C. The Knoop hardness was then determined These blends had the important advantage of becoming dust resistant in about 90 minutes. Coatings with high application solids do not usually show this characteristic.

EXAMPLE 6

Spraying of the Oligomer-containing Coatings at 60% Solids

The following 30% star composition was spray applied at 60% solids, the solids produced when Part I was combined with Part II, each as defined below. Initial viscosity was 33 sec. in a #2 Zahn cup. It increased to 36.5 seconds in 1 hour. Hardness at room temperature reached 0.5 KHN in 4 hours, and increased to about 2 KHN overnight. Final hardness was about 5.5–6. These measurements were made on 2 mil films applied to glass.

| Wt. Used | Component | Solids |
|---|---|---|
| Part I: | | |
| 56.11 | Methacrylate Star | 30 |
| 31.10 | Adduct(Exp. 1) | 31.1 |
| 4.0 | Acetyl Acetone | |
| 0.20 | DBTDL,[a] 10% in MEPGA[b] | 0.02 |
| 32.05 | MAK[c] | |
| 0.19 | BYK-323[d] | 0.1 |
| | (Part I is 49.5% solids) | |
| Part II: | | |
| 43.23 | Des N-3390 | 38.9 |

[a]DBTDL is dibutyl tin dilaurate, the catalyst for the isocyanate crosslinking reaction
[b]MEPGA is a solvent, monomethyl ether of propyleneglycol acetate
[c]MAK is methyl n-amyl ketone
[d]BYK-325 is a surface tension control agent purchased from Byk-Chemie, USA, 524 S. Cherry Street, Wallingford, Connecticut, 06492.

This high solids clear was compared to a high quality commercially available isocyanate crosslinked clear in the following Table 8.

TABLE 8

| Test Results | Control | Above Composition |
|---|---|---|
| % Solids | 38.3 | 60.0 |
| Viscosity, initial | .144 | .65 |
| Viscosity, 2 hrs. | .182 | 1.29 |
| Viscosity, 4 hrs. | .321 | 2.50 |
| Cotton free time, min[a] | 60 | 60 |
| Film Thickness | 1.8 | 1.9 |
| KHN, 4 hrs. | 0.30 | 0.68 |
| KHN, 24 hrs. | 4.3 | 1.78 |
| KHN, 2 hrs, 80° C. | 11.5 | 4.0 |
| 20° Gloss, Baked | 95 | 91 |

Note that the experimental coating can be applied at much higher solids than the control while still rapidly developing hardness. The coatings had essentially the same gloss, thus both had a very attractive appearance.
[a]The cotton free time was determined by dropping a cotton ball on the film at 5 minute intervals until the cotton no longer left fibers on the surface.

EXAMPLE 7

Fluoropolymer Clear Toughened with Experiment 1 Adduct

Coating blends of Lumaflon ® 916 reactive chlorotrifluoroethylene/vinyl ether polymer (35%), diol oligomer of Experiment 1 and Desmodur ® 3390 isocyanate crosslinker (39.5%) were prepared as in Example 1. A chemically resistant, damage resistant, <3.5 lb/gallon of solvent clear was produced.

TABLE 9

| Sample # | % Lumiflon ® | % Des 3390 | % CHDM Adduct[a] | PHR DBTDL[b] | Viscosity, Stokes[c] | Hardness[d] |
|---|---|---|---|---|---|---|
| 1 | 25 | 43.10 | 31.90 | 0.10 | 0.62 | 2.45 |
| 2 | 35 | 39.50 | 25.50 | 0.10 | 0.93 | 4.74 |

TABLE 9-continued

| Sample # | % Lumiflon ® | % Des 3390 | % CHDM Adduct[a] | PHR DBTDL[b] | Viscosity, Stokes[c] | Hardness[d] |
|---|---|---|---|---|---|---|
| 3 | 45 | 35.80 | 19.20 | 0.10 | 1.65 | 6.71 |

[a]Of Experiment 1
[b]Parts per 100 parts of coating polymers of dibutyl tin dilaurate catalyst for isocyanate/polyol reaction extend the mix life
[c]Polymers were thinned to 60% by weight with methyl ether of propyleneglycol acetate and xylene
[d]Films were cast with a 10 mil knife, and baked for 2 hours at 121° C. The Knoop hardness was then determined When these coatings were applied on 28 gauge steel they passed 160 inch/pounds of direct impact without damage. This showed these materials to have a very good hardness/flexibility balance.

EXAMPLE 8

Fluoropolymer Clear with Oligomer Crosslinked with Melamine Resin

Other crosslinking agents that react with hydroxyl groups were used with the oligomers of the present invention. The following Table 10 data shows that viscosity was reduced with very little sacrifice in hardness by using oligomer in a melamine resin crosslinked blend. The blends had good impact resistance and were resistant to 10% sulfuric acid up to 60° C. in a test simulating resistance to acid rain. In addition, the use of oligomer of the present invention, which was substantially cheaper than the fluoropolymer, provided a more economical coating.

TABLE 10

| Sample # | Lumiflon ® 916 | % CHDM Adduct[a] | Cymel ® 1133[b] | Viscosity Stokes[c] | Hardness[d] |
|---|---|---|---|---|---|
| 1 | 80 |    | 20 | 5.5  | 11.2 |
| 2 | 65 | 15 | 20 | 2.85 | 10.5 |
| 3 | 55 | 25 | 20 | 1.92 | 9.58 |

[a]Of Experiment 1
[b]1 part of dodecylbenzene sulfonic acid was added to 100 parts of coating as a crosslinking catalyst
[c]Polymers were thinned to 55% by weight with methyl ether of propylene glycol acetate and xylene
[d]Films were cast with a 7 mil knife, and baked 30 minutes at 121° C. The Knoop hardness was then determined Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

What is claimed is:

1. A crosslinkable coating composition, wherein a polyol component comprises a compound of the formula

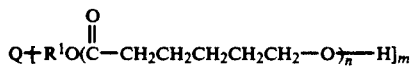

$$Q\!+\!R^1O(\overset{O}{\overset{\|}{C}}\!-\!CH_2CH_2CH_2CH_2CH_2\!-\!O)_{\!n}\!-\!H]_m$$

wherein:
$R^1$ is a covalent bond or alkylene containing 1, 2, 3 or 4 carbon atoms;
n is about 1 to about 4;
m is 2, 3 or 4; and
Q is a saturated carbocyclic ring containing 5 or 6 carbon atoms, or S-$R^2$-T wherein S and T are each independently saturated carbocyclic rings containing 5 or 6 carbon atoms, and $R^2$ is a covalent bond or an alkylene group containing 1, 2, 3 or 4 carbon atoms;
provided that no more than one $R^1$ is bound to any carbocyclic carbon atom, and further provided that when Q is S-$R^2$-T, each $R^1$ is bound to a carbon atom of the carbocyclic rings of S and T.

2. The crosslinkable coating composition as recited in claim 1 wherein Q is a saturated carbocyclic ring containing 5 or 6 carbon atoms.

3. The crosslinkable coating composition as recited in claim 2 wherein Q is cyclohexylene.

4. The crosslinkable coating composition as recited in claim 3 wherein Q is 1,4-cyclohexylene.

5. The crosslinkable coating composition as recited in claim 1 wherein $R^1$ is a covalent bond or methylene.

6. The crosslinkable coating composition as recited in claim 4 wherein $R^1$ is a covalent bond or methylene.

7. The crosslinkable coating composition as recited in claim 1 wherein n is about 1 to about 2.

8. The crosslinkable coating composition as recited in claim 6 wherein n is about 1 to about 2.

9. The crosslinkable coating composition as recited in claim 1 wherein m is 2.

10. The crosslinkable coating composition as recited in claim 1 wherein said compound is a liquid at the lower of ambient or application temperature.

11. The crosslinkable coating composition as recited in claim 1 further comprising a complimentary reactive group selected from the group consisting of epoxy, carboxylic anhydride, isocyanate, ketoxime blocked isocyanate, carboxylic acid, or formaldehyde modified melamine.

12. The crosslinkable coating composition as recited in claim 11 wherein the complimentary reactive group is formaldehyde modified melamine or isocyanate.

13. The crosslinkable coating composition as recited in claim 12 wherein the complimentary reactive group is isocyanate.

14. The crosslinkable coating composition as recited in claim 1 wherein Q is S-$R^2$-T.

15. The crosslinkable coating composition as recited in claim 14 wherein S and T are each 1,4-cyclohexylene.

16. The crosslinkable coating composition as recited in claim 14 wherein said $R^2$ is 2,2-propylene or methylene.

17. The crosslinkable coating composition as recited in claim 15 wherein $R^2$ is 2,2-propylene or methylene.

18. The crosslinkable coating composition as recited in claim 14 wherein $R^1$ is a covalent bond.

19. The crosslinkable coating composition as recited in claim 17 wherein $R^1$ is a covalent bond.

20. The crosslinkable coating composition as recited in claim 18 wherein n is from about 1 to about 2.

21. The crosslinkable coating composition as recited in claim 19 wherein n is from about 1 to about 2.

22. The crosslinkable coating composition as recited in claim 14 wherein m is 2.

23. The crosslinkable coating composition of claim 1 which is cured.

24. The crosslinkable coating composition of claim 6 which is cured.

25. The crosslinkable coating composition of claim 7 which is cured.

26. The crosslinkable coating composition of claim 8 which is cured.

27. The crosslinkable coating composition of claim 11 which is cured.

28. The crosslinkable coating composition of claim 15 which is cured.

29. The crosslinkable coating composition of claim 19 which is cured.

* * * * *